(12) United States Patent
Glotov

(10) Patent No.: US 7,767,159 B2
(45) Date of Patent: Aug. 3, 2010

(54) CONTINUOUS FLOW SONIC REACTOR AND METHOD

(76) Inventor: Victor Nikolaevich Glotov, 2 Sivashakaja, Case 2, Apt. 150, Moscow 113038 (RU)

( * ) Notice: Subject to any disclaimer, the term of this patent is extended or adjusted under 35 U.S.C. 154(b) by 457 days.

(21) Appl. No.: 11/729,753

(22) Filed: Mar. 29, 2007

(65) Prior Publication Data

US 2008/0236160 A1 Oct. 2, 2008

(51) Int. Cl.
*B06B 1/00* (2006.01)
(52) U.S. Cl. ............................ 422/127; 422/128
(58) Field of Classification Search ............... 422/127, 422/128; 204/157.15; 415/230; 181/296
See application file for complete search history.

(56) References Cited

U.S. PATENT DOCUMENTS

| | | | |
|---|---|---|---|
| 4,236,889 A | 12/1980 | Wright | 433/86 |
| 4,691,724 A | 9/1987 | Garcia et al. | 134/169 R |
| 4,844,691 A | 7/1989 | Hallman et al. | 415/169.1 |
| 5,348,444 A | 9/1994 | Metzinger et al. | 416/179 |
| 5,658,534 A * | 8/1997 | Desborough et al. | 422/128 |
| 5,914,027 A * | 6/1999 | Ellingsen | 208/126 |
| 6,974,305 B2 * | 12/2005 | Garrett, III | 415/230 |
| 7,083,764 B2 | 8/2006 | Scott | 422/186 |
| 7,521,023 B2 * | 4/2009 | Laugharn et al. | 422/128 |
| 2005/0274600 A1 | 12/2005 | Gunnerman | 204/157.5 |
| 2009/0188157 A1 * | 7/2009 | Holloway et al. | 44/301 |

FOREIGN PATENT DOCUMENTS

| | | |
|---|---|---|
| EP | 0 667 386 A1 | 8/1995 |
| EP | 1 260 266 A1 | 11/2002 |
| GB | 25909 | 4/2009 |
| WO | WO 01/87471 A2 | 11/2001 |
| WO | WO 02/103322 A2 | 12/2002 |

OTHER PUBLICATIONS

International Search Report of PCT/IB2008/000698, dated Aug. 6, 2008.

* cited by examiner

*Primary Examiner*—N. Bhat
(74) *Attorney, Agent, or Firm*—RatnerPrestia

(57) ABSTRACT

A centrifugal pump adapted to excite a high-intensity sound wave in a fluid feedstock is disclosed. The impeller and stator of the pump are provided with multiple apertures sized and spaced to produce a sound wave of an intensity greater than one megawatt per square meter in the fluid. The sound wave forms cavitation bubbles in the fluid, and the static pressure in the pump combines with the compression cycle of the sound wave to collapse the bubbles at a rate sufficient to cause exothermic reactions in the fluid. The sonic reactor can be configured for use to produce thermal energy, oil refining, catalyst production, water desalination and other uses.

17 Claims, 14 Drawing Sheets

CONTINUOUS FLOW SONIC REACTOR AND METHOD

BACKGROUND OF THE INVENTION

The present invention relates generally to the use of sound to create exothermic reactions in fluids, and in particular to the use of a centrifugal reactor adapted to create sonic energy to collapse cavitation bubbles in the fluid feedstock at a rate of speed sufficient to cause an exothermic reaction in the feedstock.

It is known that chemical reactions can be created in a fluid by irradiating the fluid with ultrasonic energy of sufficient intensity to cause the formation and subsequent collapse of cavitation bubbles in the fluid. The chemical effects of ultrasound stem from the physical processes that apparently create, enlarge, and collapse bubbles of gaseous and vaporous cavities in a fluid. During the expansion cycle of an intensive ultrasound wave, the fluid is believed to be subjected to tensile stresses exceeding its ultimate strength, resulting in the bursting of the fluid. The resulting discontinuities, subjected to the action of surface tension forces, acquire the shape of spherical bubbles and become filled with vapors and gases dissolved in the fluid. During the compression cycle of the ultrasound wave, the bubble begins to collapse and the bubble walls rush at a high rate of acceleration towards the bubble center, thus compressing the vapor/gas mixture and causing peculiar reactions that liberate heat, which is absorbed by the fluid. The rate of collapse of the cavitation bubble, and thus the heat available for absorption by the fluid, is generally proportional to the intensity of the ultrasound wave.

The use of ultrasound to create a variety of chemical reactions, including the conversion of water ($H_2O$) into hydrogen peroxide ($H_2O_2$) and molecular hydrogen ($H_2$) and the "cracking" of alkanes into fragments such as gasoline, is described in Kenneth S. Suslick, The Chemical Effects of Ultrasound, Scientific American (1989). A variety of ultrasound systems have been described in the art, the "probe" type systems being commonly employed, and which generally include an ultrasonic transducer that generates ultrasonic energy and transmits the energy to a probe.

GB 25,909 (1908) discloses centrifugal pumps consisting of a combination of impeller, free vortex and short guide vanes of thin metal to guide fluid from the vortex to a delivery passage. Constant pressure rather than pulsating pressure is utilized to avoid or minimize damage to the thin metal vanes.

U.S. Pat. No. 6,974,305 B2, Garrett, describes roto-dynamic fluidic systems for generating cavitation in fluids.

U.S. Pat. No. 7,083,764 B2, Scott, describes a method and apparatus for treating fluids by transmitting ultrasonic energy into the fluids to produce high intensity cavitations in the fluids as the fluids pass through the apparatus.

US 2005/0274600 A1, Gunnerman, describes liquids treated by ultrasound in a flow-through reaction vessel with an elongate ultrasonic horn mounted to the vessel.

However, the usefulness of prior methods employing ultrasound is believed to have been limited by the power of currently available ultrasound generators. The rate of collapse of the cavitation bubbles, and hence the potential for high-energy reactions in the bubbles, depends in part on the magnitude of the positive pressure exerted on the cavitation bubbles during the compression cycle of the ultrasound wave. Ultrasound generators known in the prior art generally produce no more than approximately 50 atmospheres of pressure during the compression cycle of the ultrasound wave. The nature of the high-energy reactions taking place in the cavitation bubbles has been accordingly limited.

Ultrasound processing also is sensitive to processing costs and particularly the energy consumption involved in generating the ultrasonic vibrations. It is also difficult to regulate frequencies and ultrasound power. These and other difficulties have limited industrial applications of ultrasound technology.

The present invention discloses improvements in ultrasound treatment to achieve a high rate of collapse of the cavitation bubbles so that the molecular energy of a fluid can be efficiently converted into heat energy in the fluid to provide a desired chemical reaction. Further, the present invention discloses an improved method of exciting a high-intensity sonic wave in a fluid, and provides an improved apparatus for exciting such a high-intensity sonic wave in a fluid.

The present invention further discloses an efficient method of generating heat energy in a fluid by subjecting it to high-intensity sonic waves.

SUMMARY OF THE INVENTION

In summary, the present invention discloses a mechanical process involving the formation of cavitation bubbles in a feedstock and the subsequent collapse of the cavitation bubbles under sonic stress, e.g., with a sound wave. This straightforward method can be readily adapted to any fluid. The use of a modified centrifugal pump allows for the formation of the cavitation bubbles. The sonic stress allows for the collapse of said bubbles. Further disclosed is the creation of a high intensity ultrasound wave which can be generated by flowing a fluid through a centrifugal pump which has been modified with apertures, or holes, in the impeller and/or stator. The present configuration of pump offers significant advantages in producing ultrasound wave intensities not previously achievable.

The inventive continuous flow sonic reactor illustrates a device for the generation of ultrasonic fluctuations in a flow of matter and can be used for physio-chemical synthesis, thermal energy installations, biotechnology and medicine, organic synthesis, preparation of suspensions, and in areas where continuous processing by high powered ultrasound is required.

The invention includes flowing a fluid feedstock through a centrifugal reactor having apertures in the impeller and stator. The apertures are sized and spaced along the cylindrical impeller and stator so that the flow of the feedstock through the rotating impeller creates a high-intensity sonic wave in the feedstock. The physical characteristics and operating parameters of the reactor are such that the sonic field intensity exceeds one megawatt per square meter. If the ultrasonic reactor is to be used in a mode exceeding 1 megawatt per square meter, it is necessary to apply, in addition to thermal and sound insulation, measures to protect against the effects of radiation. Albeit, experiments conducted with water as the fluid produced insignificant amounts of radioactive radiation. The reactor may be used for carrying out nuclear processes. The constant pressure in the reactor amplifies the cavitation effect by summing with the pressure applied to the cavitation bubbles during the compression cycle of the sound wave.

Water may be used as a feedstock to transfer heat generated by reactions caused by the collapse of cavitation bubbles to the user. To increase the processing interval, the sonic reactor is realized in the form of a multistage centrifugal pump-like apparatus. The multistage centrifugal reactor is fitted with a pipe connecting the reactor outlet to the reactor inlet to permit recirculation of the fluid feedstock. A multisectional generator can be employed.

While the invention will be described relative to treatment of fluids, the cavitation effect is also observed in gases. Consequently, the effect described herein is possible both in working gas turbines and in reactors likewise-modified to work with gases. Therefore the word "fluid" as used herein, is intended to mean either liquid or gas/vapor media.

Embodiments of the present invention provide an apparatus and a method for facilitating continuous flow in a sonic reactor. The reactor or apparatus comprises at least one reaction chamber having a rotating centrifugal impeller and a stator mounted therein; an inlet on the reaction chamber for supplying a fluid feedstock; an outlet on the reaction chamber for receiving the treated feedstock; and a plurality of apertures formed in the stator, said apertures being sized and positioned to cause cavitation in the reactor and create sonic energy to act on the feedstock.

An alternate embodiment includes a continuous flow sonic reactor comprising at least one reaction chamber having a rotating centrifugal impeller and a stator mounted therein; an inlet on the reaction chamber for supplying a fluid feedstock; an outlet on the reaction chamber for receiving the treated feedstock; and, a plurality of apertures formed in the impeller, the apertures being sized and positioned to cause cavitation in the reactor and create sonic energy to act on the feedstock.

Yet another alternate embodiment includes a continuous flow sonic reactor, comprising at least one reaction chamber having a rotating centrifugal impeller and a stator mounted therein; an inlet on the reaction chamber for supplying a fluid feedstock; an outlet on the reaction chamber for receiving the treated feedstock; and, a plurality of apertures formed in the impeller and stator, the apertures being sized and positioned to cause cavitation in the reactor and create sonic energy to act on the feedstock.

A method for treating a fluid feedstock with a sonic reactor is also disclosed, comprising the steps of flowing a fluid feedstock through a sonic reactor; forming cavitation bubbles in the fluid feedstock; and collapsing the cavitation bubbles in the fluid feedstock with sound to cause an exothermic reaction in the fluid feedstock.

In an embodiment, the present inventive reactor is part of a larger unit consisting of at least three interconnected modules, with means to connect therebetween: (a) a pump and ultrasound reactor block, which may have the appearance similar to that of a serial centrifugal pump, (b) a separator and condenser block, and (c) a process control block. Means envisioned to interconnect the modules could be pipes, electrical connections, and the like.

The inventive reactor block (a) which can be assembled on a metal frame, generally includes at least pumps, valves, fixtures, sensors, and the ultrasound reactor. The frame has hooks for assembly and loading work, and can be placed in containers for transportation by truck, rail, or other means. When in use, the container protects the unit and workers from among other items, unfavorable weather conditions. The separator and condenser block (b) generally consists of a heat exchange block and includes at least a separator, condenser, fixtures and sensors. The frame is equipped with hooks or equivalent means for unit loading and assembly. The unit can be placed in containers for transportation. The process control block (c) operates the pumps and gradually regulates the rotating speed of the ultrasound reactor actuator and displays main parameters such as temperature and pressure. It is preferably constructed as a separate block from the reactor block (a) and the separator and condenser block (b), and can be placed in a remote area, for example, inside of block (a) or on its outside surface. The separator/condenser block (b) and the process control block (c) can be such as is currently known in the art and fitted with means to connect to the pump and reactor block (a).

Further embodiments and features will be apparent from the description which follows.

DESCRIPTION OF THE PREFERRED EMBODIMENTS

The reactor operates by moving the fluid on to the drive wheels rotating on one of several shafts. The fluid passes through a system of co-terminous and overlapping apertures of rotors and stators creating elastic fluctuations. The processing time is determined by the time it takes to pass through the working chambers of the reactor.

Figure 1:
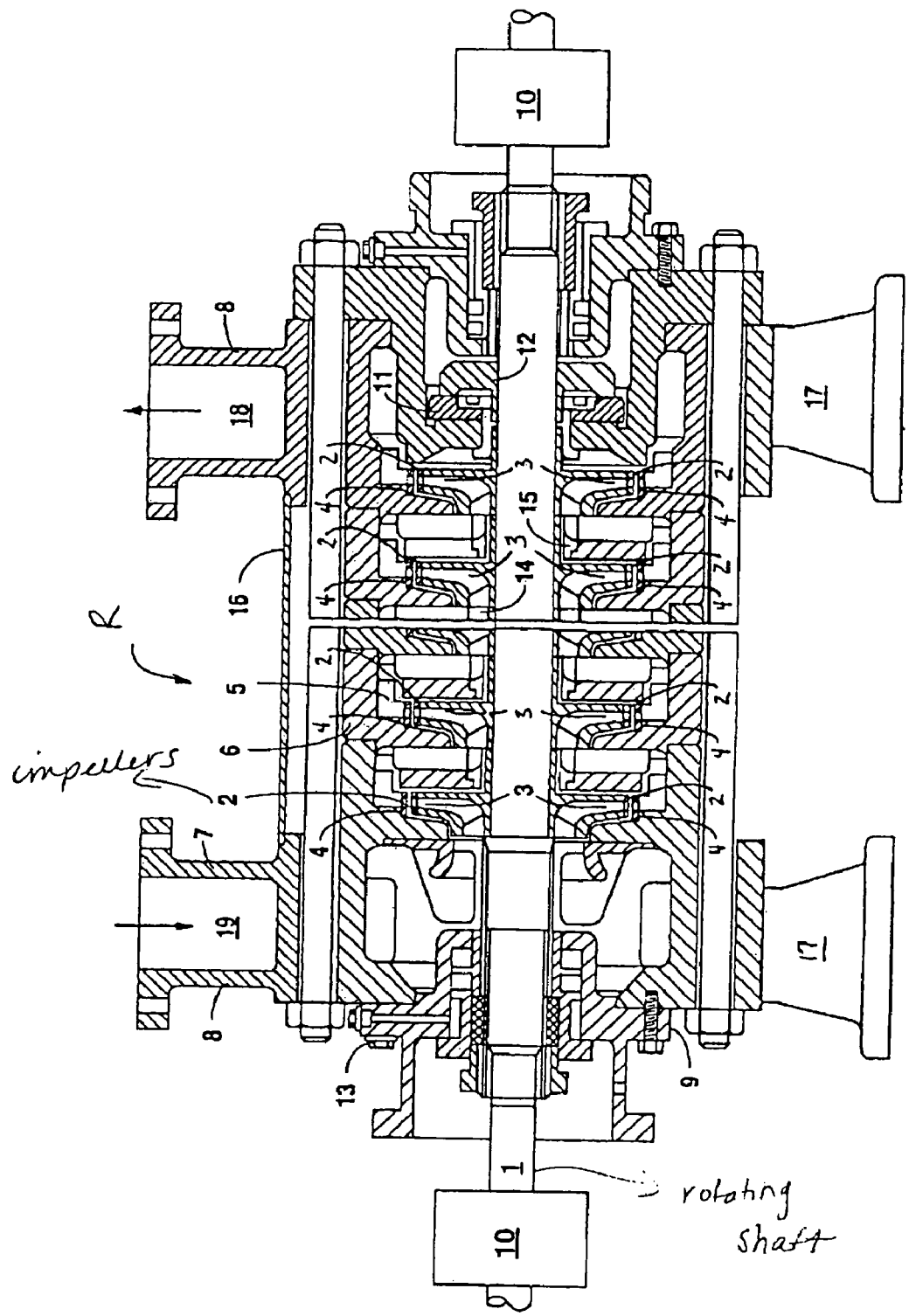
FIG. 1 is a cross-sectional view of a multistage centrifugal reactor adapted to provide a high-intensity sound wave in a fluid feedstock.

Referring now to the figures, FIG. 1 shows a cross-sectional view of a multistage centrifugal reactor R adapted to provide a high-intensity sound wave in a fluid feedstock. The rotating shaft 1 drives multiple rotors 3 mounted on the shaft. The fluid feedstock is propelled through apertures formed in impellers 2, which are rigidly mounted on the rotors, and nonrotating stators 4. Vaned or spiral-shaped volute diffusers 5 connect the outlet of each impeller to the inlet of the subsequent impeller. The rotors, impellers, stators and diffusers are installed in middle casings 6 and in two end casings 7 and 8. Also installed in the casings are sealing units 9, bearing units 10, fixed ring 11, and movable ring 12 of the hydraulic thrust bearing, device 13 for cooling the bearing supports, and the inlet and outlet connections. Each casing is provided with rings 14 and 15 of the impeller slit seals. A heat-and-sound-insulated shroud 16 encloses all of the casings. The sonic reactor is mounted on lugs 17. The outlet 18 of the reactor is connected to its inlet 19 by means of an external pipe. The reactor R is similar to a centrifugal pump. However, the purpose of the reactor is to create controlled cavitation, not prevent it as with standard pumps. The ultrasonic reactor begins to operate when the input pressure exceeds about 1.3 M Pa.

Figure 2:
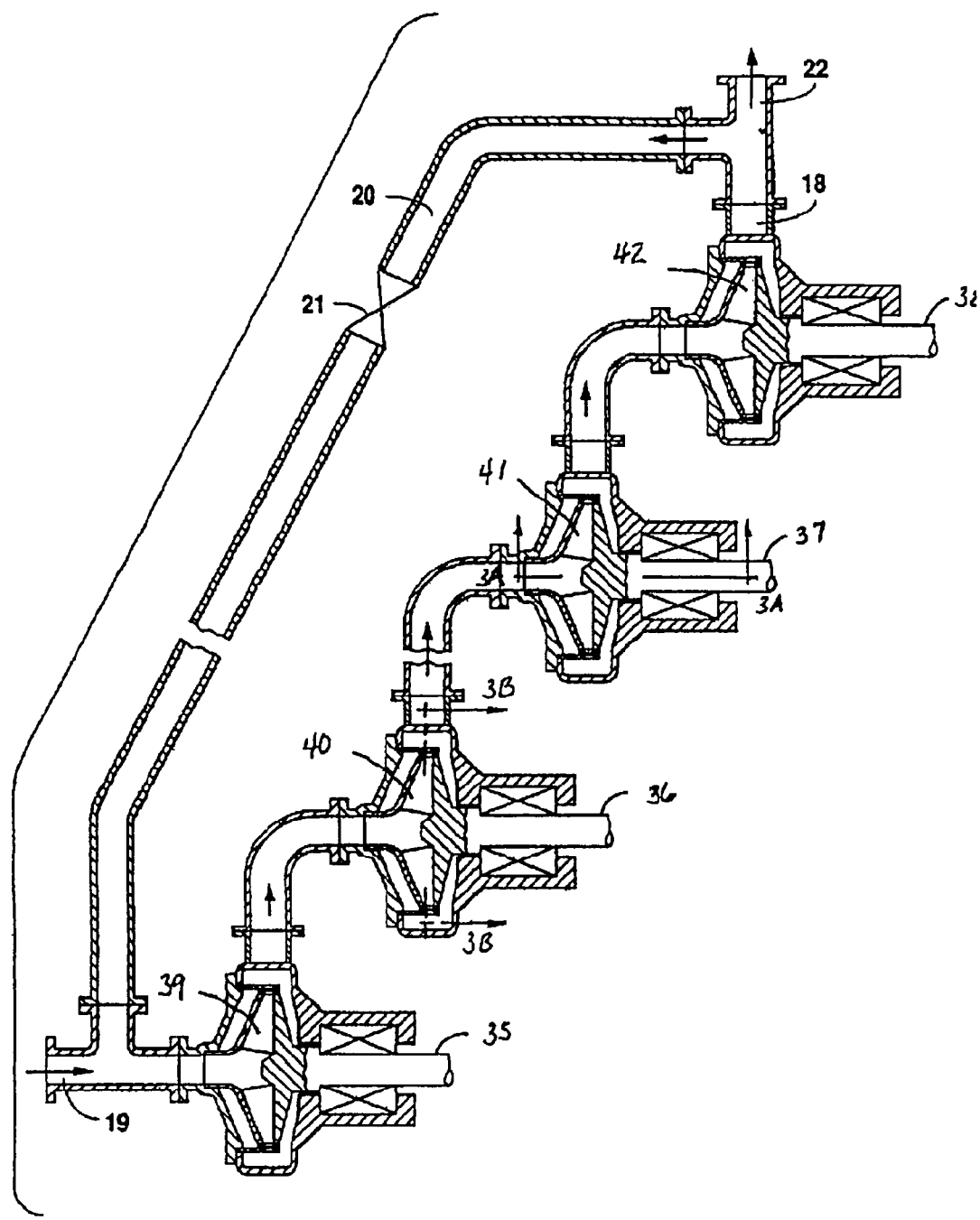
FIG. 2 is a cross-sectional view of a sonic reactor having a recirculation mechanism and an alternative arrangement of the rotors.

FIG. 2 shows a cross-sectional view of another embodiment of a sonic reactor having a recirculation mechanism and an alternative arrangement of the rotors. Although the rotors are preferably aligned axially and driven by a single shaft, the configuration of FIG. 2 may be realized, in which multiple shafts 35, 36, 37 and 38 are used to turn multiple rotors 39, 40, 41 and 42 that are not axially aligned. An exemplary design consists of two disk rotors with surface apertures rotating in opposite directions. The number of such rotors can be limitless. The diameter of apertures in rotors and stators and the distances between them vary the frequency of ultrasound. The distance between apertures influences the efficiency of the reactor, with the efficiency deceasing with reduction in distance between aperatures. In either case, outlet 18 is connected to inlet 19 by pipe 20 to permit the recirculation of the fluid feedstock if increased exposure to sonic energy is required. Inlet 19 and outlet 18 may also be connected by working rings to allow for gas cavitation. Throttle valve 21 controls the rate of recirculation of the fluid feedstock. Connection 22 placed between the throttle valve 21 and the outlet 18 from the last rotor 42 serves to drain the fluid feedstock from the reactor.

Figure 3A:
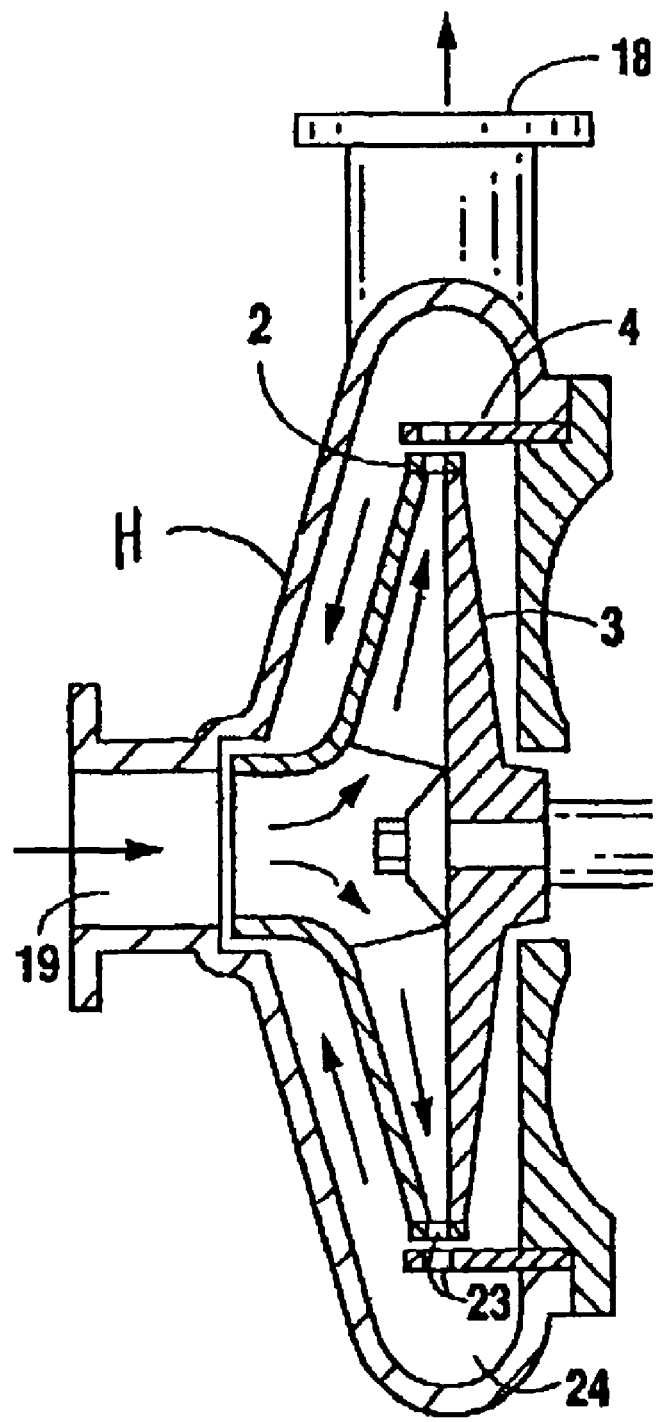
FIG. 3A is a side cross-sectional view of the reaction chamber in a single-stage reactor, including the rotor, impeller, and stator.

FIG. 3A shows a side cross-sectional view of the reaction chamber taken along line 3A-3A of FIG. 2, comprising the rotor 3 rotated mounted in housing H and upon rotating shaft 1, impeller 2 and nonrotating stator 4. Multiple apertures 23 are formed in the impeller and stator.

Figure 3B:
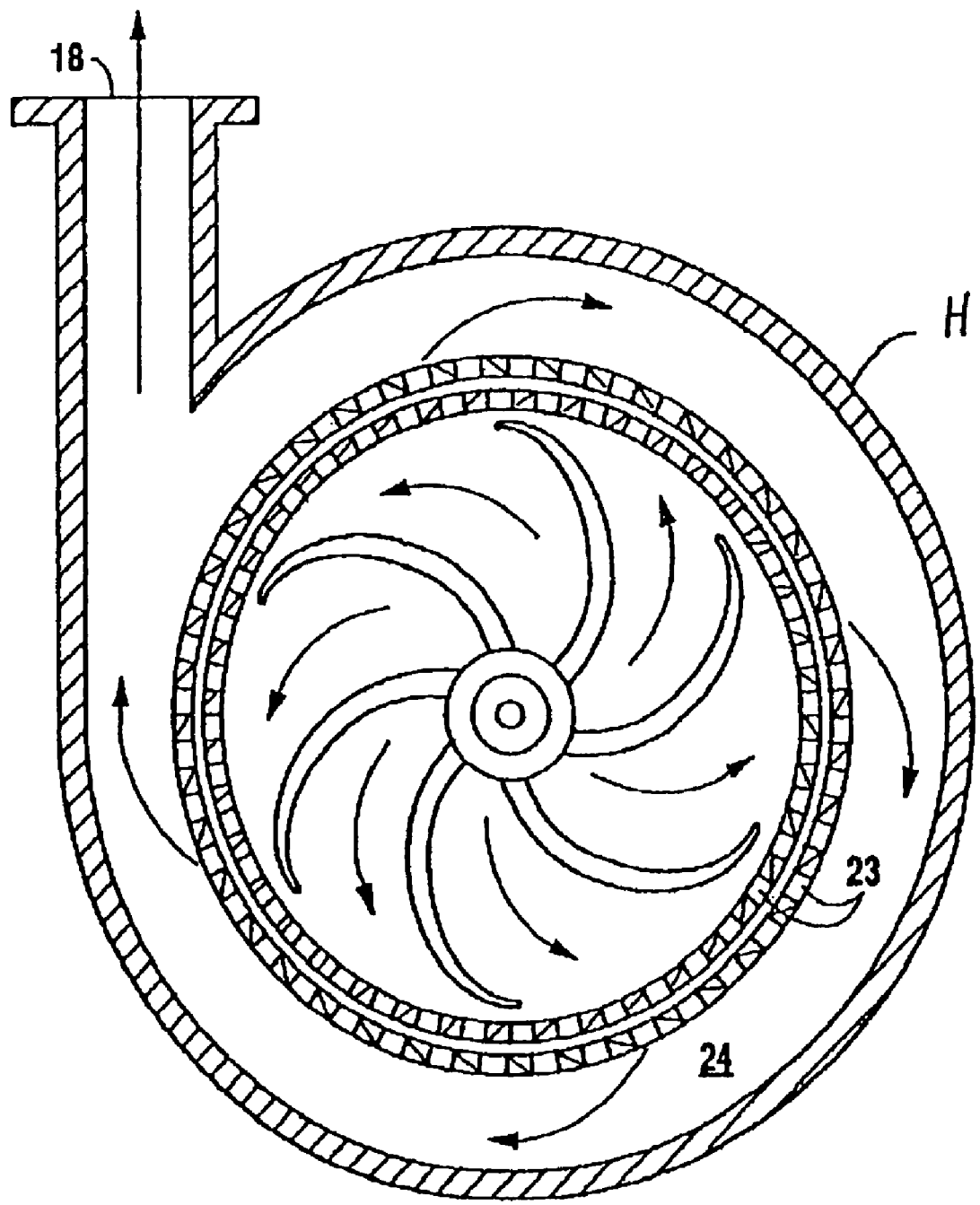
FIG. 3B is a top cross-sectional view of the reaction chamber containing the cylindrical impeller and stator with multiples apertures formed therein.

FIG. 3B shows a top cross-sectional view of the reaction chamber taken along line 3B-3B of FIG. 2. The reaction chamber includes housing H, cylindrical impeller 2 and stator 4 with multiples apertures 23 formed therein. The apertures are positioned so that the apertures in the impeller periodically coincide with the apertures in the stator. The flow of the fluid feedstock through the periodically overlapping apertures excites a sonic wave in the fluid. The sonic wave acts on the fluid as it flows through active section 24 of FIGS. 3A and 3B.

Alternatively, a sonic wave may be excited in the centrifugal reactor by forming apertures 23 solely in the impeller 2 or solely in the stator 4. Using such an arrangement, the apertures 23 must take the shape of the frustum of a cone so that the apertures narrow as the fluid flows through them. If a single set of apertures is used, it is also necessary to use external means to pump the fluid into the reaction chamber under cyclical pressure.

In a preferred embodiment employing apertures formed in both the impeller and the stator, the frequency of the sonic wave is determined by the period of coincidence of the apertures. The frequency increases as the inter-aperture distance decreases. The optimal frequency of the sonic reactor in the preferred embodiment is in the range of 1.5 kHz to 50 kHz, preferably about 20-50 kHz; further increases in frequency reduce the efficiency of the process due to energy losses. Also, it has been found that above 50 kHz, cavitation is difficult to induce. The inter-aperture distance required to produce a frequency in the desired range will be a function of the rotation rate of the rotor and the diameter of the impeller and stator.

The intensity of the sound wave is proportional to the static pressure in the pump. In turn, the static pressure depends on the velocity of the fluid as it approaches the impeller 2 of FIG. 3A. Because the flow rates at inlet 19 and outlet 18 are approximately equal, the velocity of the fluid as it approaches the apertures 23 in the impeller is proportional to the cumulative area of the apertures. Accordingly, the static pressure and the sound intensity are functions of the ratio of the cumulative area of the apertures 23 to the area of the inlet 19. The intensity of the sound wave also varies with frequency, since losses induced by higher frequencies reduce the efficiency of the process, as discussed above.

Factors influencing cavitation include at least the following: the physical properties of the solvent, temperature, ultrasound frequency, vapor or gases, purity of the reaction system, external pressure, and strength of the ultrasound.

Physical properties of the solvent chosen for cavitation must be considered in determining optimal conditions for producing sonochemical reactions. Properties to consider include for example, intermolecular forces such as hydrogen bonding, Vander Vaals forces and surface tension.

Sonochemical reactions are generally carried out at the lowest possible temperature. In a given case, a temperature decrease is used to reduce the pressure of saturated steam in the solvent. Temperatures at or near the boiling point of the chosen solvent result in solvent steam build up in the cavitation bubbles, which leads to the bubbles softening and eliminating the desired collapse.

The solubility of gases depends, in part, on outside pressure, wherein a sudden decrease of pressure results in escape of soluble gases, separating the soluble gases from fluid, and forming nucleus cavitation bubbles.

Figure 4:
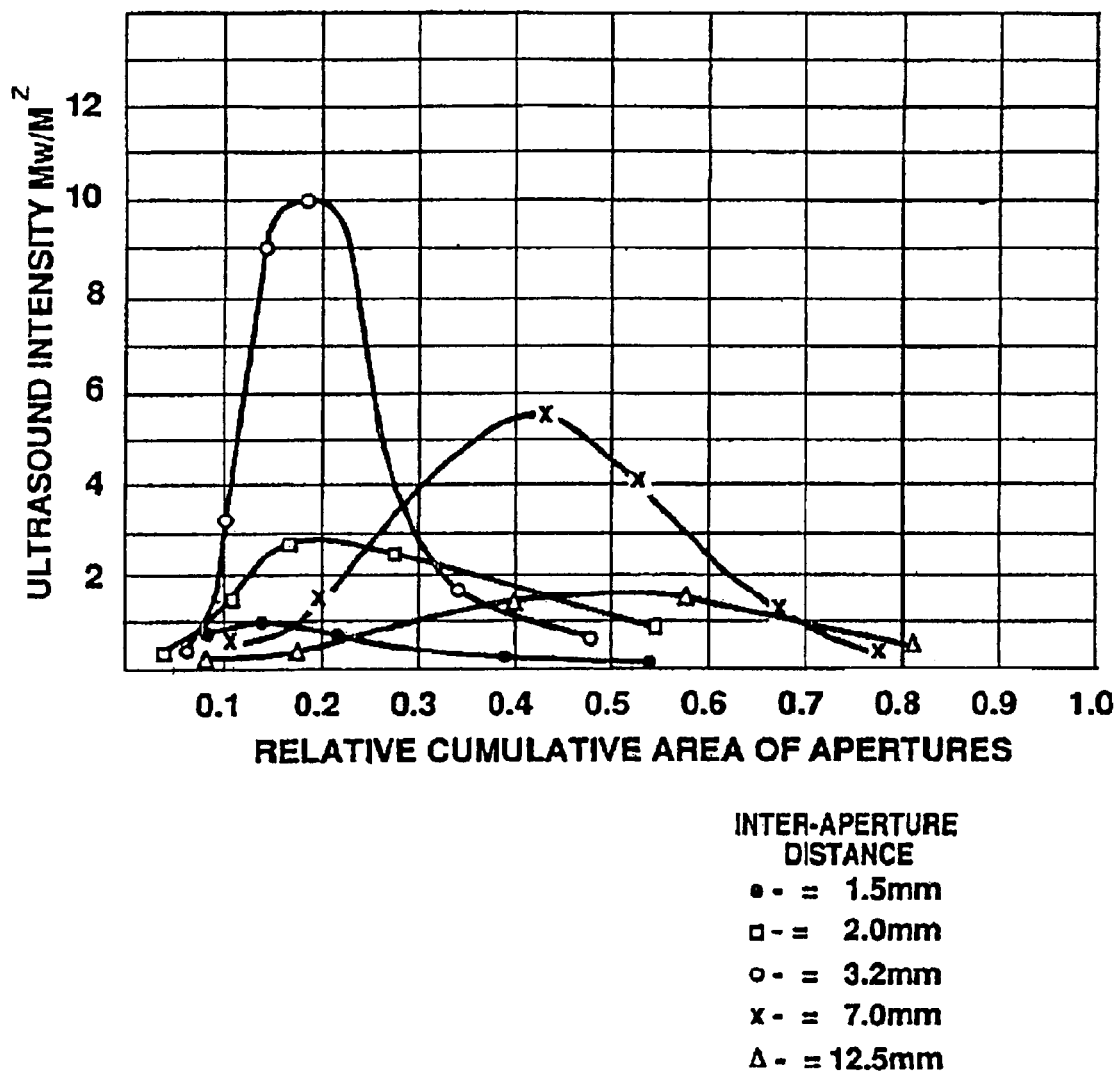
FIG. 4 is a graph of the variation of sound intensity with the relative cumulative area of the apertures for different inter-aperture distances.

FIG. 4 depicts examples showing the variation of sound intensity with the relative cumulative area of the apertures for different inter-aperture distances. The Y-axis represents sound intensity in $MW/m^2$. The X-axis represents the relative cumulative area of the apertures, which is the ratio of the cumulative area of the apertures to the area of the reactor 19 of FIG. 1. The different curves represent results for inter-aperture distances varying from 1.5 mm to 12.5 mm. The greatest sound intensity is produced by a 3.2 mm inter-aperture distance in the preferred embodiment having a rotor diameter of 0.26 m and a rotation rate of 2920 revolutions per minute. The inter-aperture distance necessary to produce a sonic wave of a given frequency will vary with, among other things, the rotation rate and diameter of the rotor, and is given by $$f = KDR/dA$$

where f is the frequency of the sonic wave, D is the diameter of the rotor in meters, R is the rate of rotation of the rotor in revolutions per second, dA is the inter-aperture distance in meters, and K is a proportional constant that depends on the fluid chosen as the feedstock, the rotor composition, and the gap between the rotor and stator.

Figure 5:
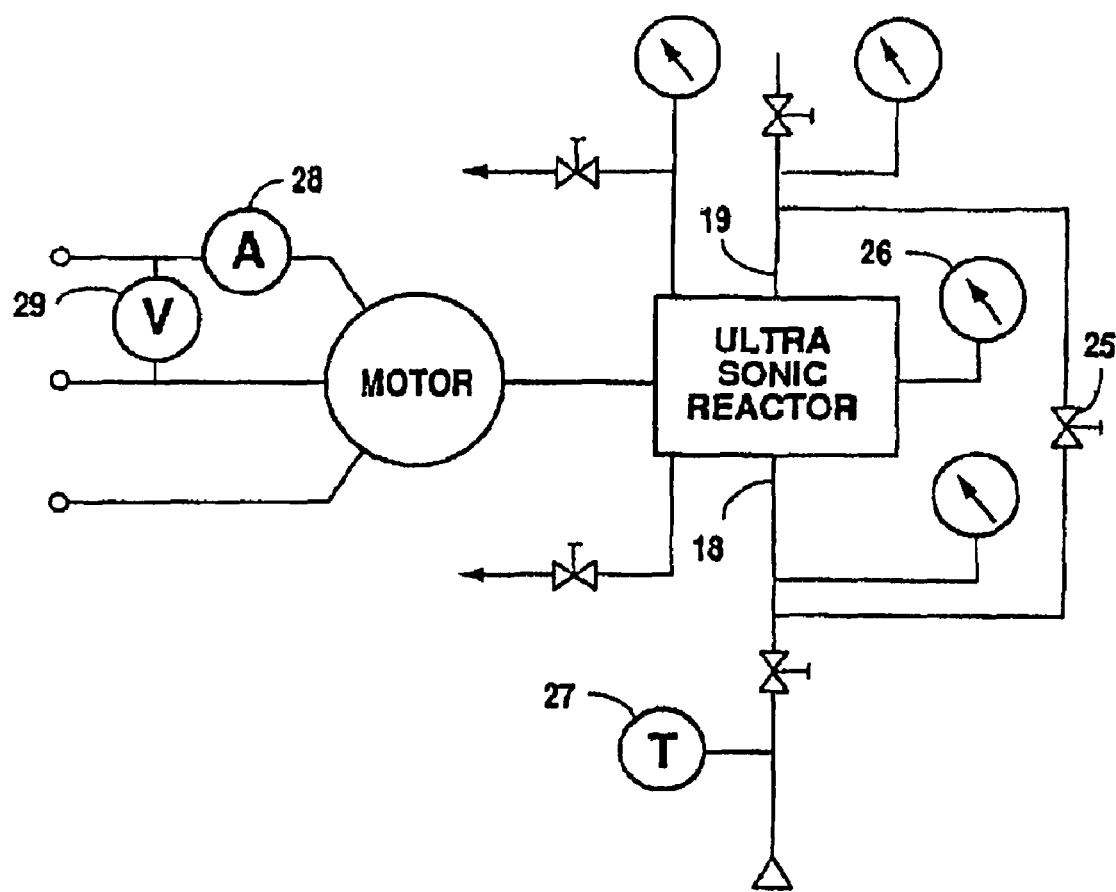
FIG. 5 is a schematic of a sonic reactor configured for measuring the relationship between input power and output power.

FIG. 5 schematically shows a typical sonic reactor configured for measuring the relationship between input power and output power. The output power is a result of heat liberated by the reactions caused by the collapse of cavitation bubbles to the user. In an embodiment, ordinary water is used as a feedstock. The processing interval during which the fluid is subjected to sound is increased by opening valve 25 to return the fluid from outlet 18 to inlet 19 for purposes of recirculation. The static pressure in the reaction chamber is measured by manometer 26. The output power of the reactor is calculated by measuring the rate of fluid flow and the temperature differential at the outlet and inlet of the reactor. Thermometer 27 measures the temperature of the fluid drained from the reactor at the end of the processing interval.

Figure 6A:
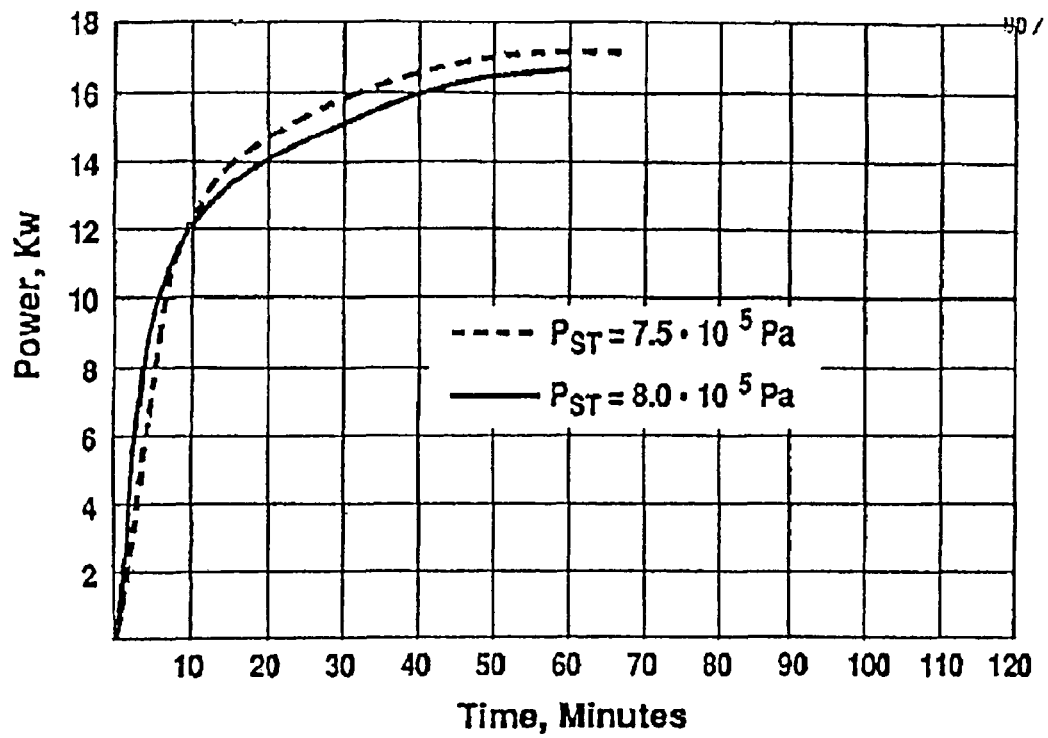
FIG. 6A is a graph of the output power as a function of the duration of activation of the sonic reactor for two different static pressure levels.

Experiments were run in which water was used as the fluid feedstock. The sound intensity was varied within the range of 1-12 MW/m$^2$. The static pressure in the chamber was maintained within the range of 0.1 to 2.4 MPa. FIG. 6A shows the output power in kilowatts on the Y-axis as a function of the time of activation of the sonic reactor in minutes on the X-axis for two different static pressure levels. The output power increases rapidly with time as the rotation rate of the rotor increases from zero to its stable value. Under continuous processing, the fluid temperature increases to the point where the best cavitation conditions are reached and no further increase in output power occurs. The power output may also be controlled by varying the interval (processing interval) during which the fluid is present in the reactor. The aggregate time during which the fluid remains in the reactor is a function of the flow rate and the number of recirculations through the reactor.

Figure 6B:
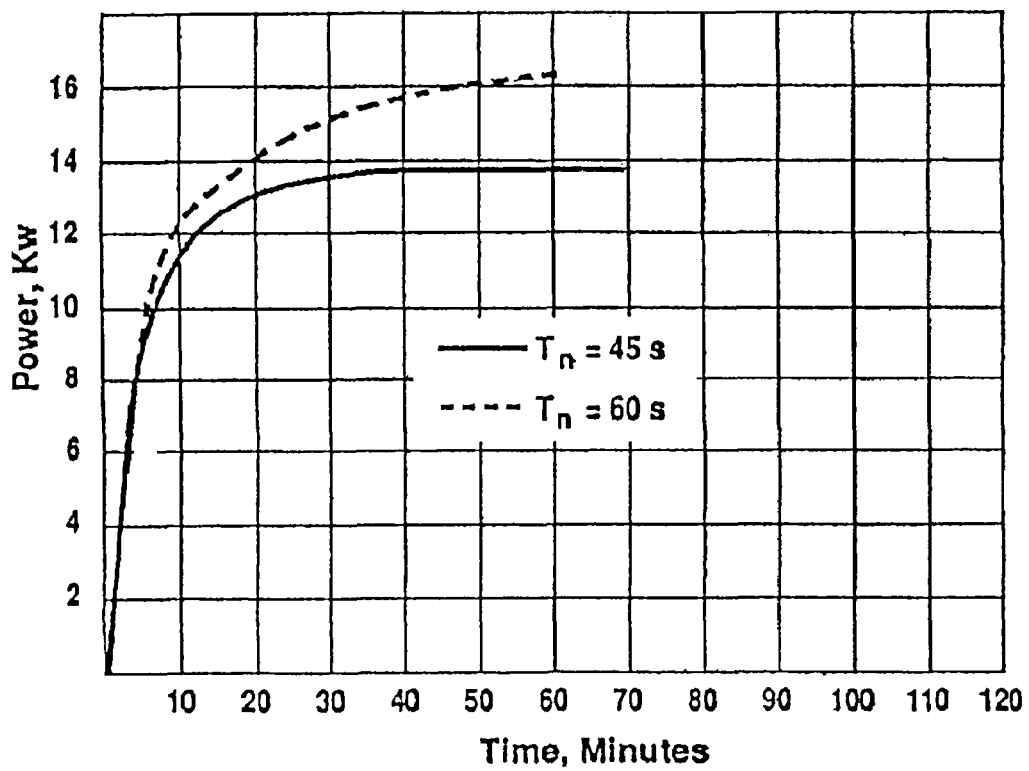
FIG. 6B is a graph of the dependence of the output power on the processing interval for experimentally observed intervals of 45 seconds and 60 seconds.

FIG. 6B shows the dependence of the output power on the processing interval for experimentally observed processing intervals of 45 seconds and 60 seconds. The Y-axis shows the output power in kilowatts, and the X-axis shows the duration of activation of the reactor in minutes. The two curves show a greater rate of increase and a greater steady-state value of the output power for a processing interval, Tn, of 60 seconds than for a processing level of 45 seconds.

The relationship between the output power and the input power of the sonic reactor is determined by measuring the current and voltage input to the motor driving the shaft to which the rotor is fixed. In FIG. 5, consumed electric power is calculated from the readings of ammeter 28 and voltmeter 29. The input power of the reactor is determined by reducing the input electrical power of the motor by the motor characteristic cosine f and the mechanical losses of the motor. The difference between the output power and the input power is attributable to the heat energy liberated by reactions induced by the collapse of cavitation bubbles in the fluid feedstock.

Figure 7:
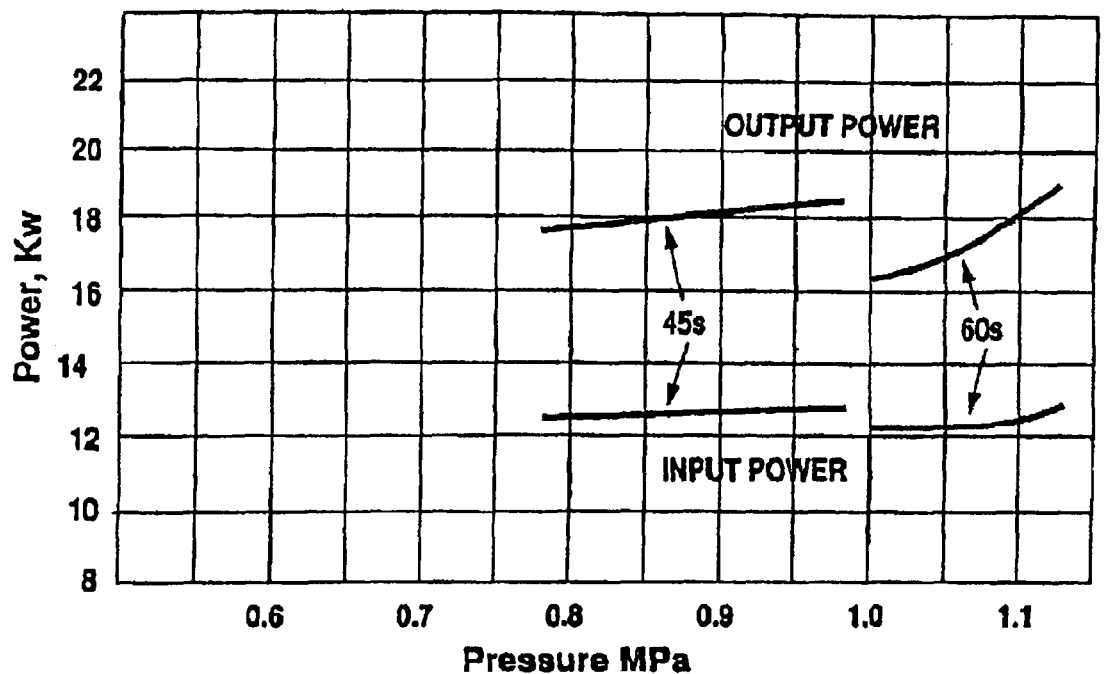
FIG. 7 is a graph of the output power increase over the input power as a function of the static pressure for processing intervals of 45 seconds and 60 seconds.

FIG. 7 shows the output power increase over the input power as a function of the static pressure for processing intervals of 45 seconds and 60 seconds. The Y-axis represents the output power of the reactor in kilowatts, and the X-axis represents the static pressure in the reactor in megapascals. For a processing interval of 45 seconds, the reactor yields approximately 50% more output power than it consumes in electrical power.

Figure 8:
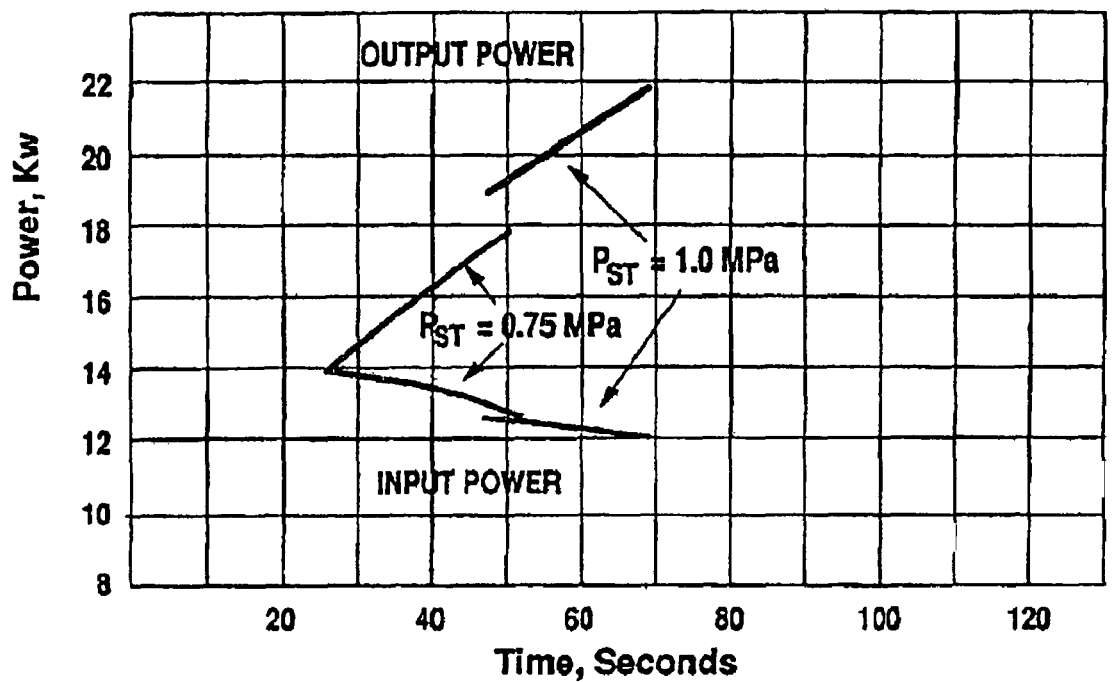
FIG. 8 is a graph of the output power increase over the input power as a function of the processing interval for static pressure levels of 0.75 MPa and 1.0 Mpa.

FIG. 8 shows the output power increase over the input power as a function of the processing interval for static pressure levels of 0.75 MPa and 1.0 MPa. The Y-axis represents the output power of the reactor in kilowatts, and the X-axis represents the processing interval in seconds. The output power increases substantially over the input power as the static pressure is increased to 1.0 MPa and the processing interval is increased to approximately 70 seconds.

Figure 9:
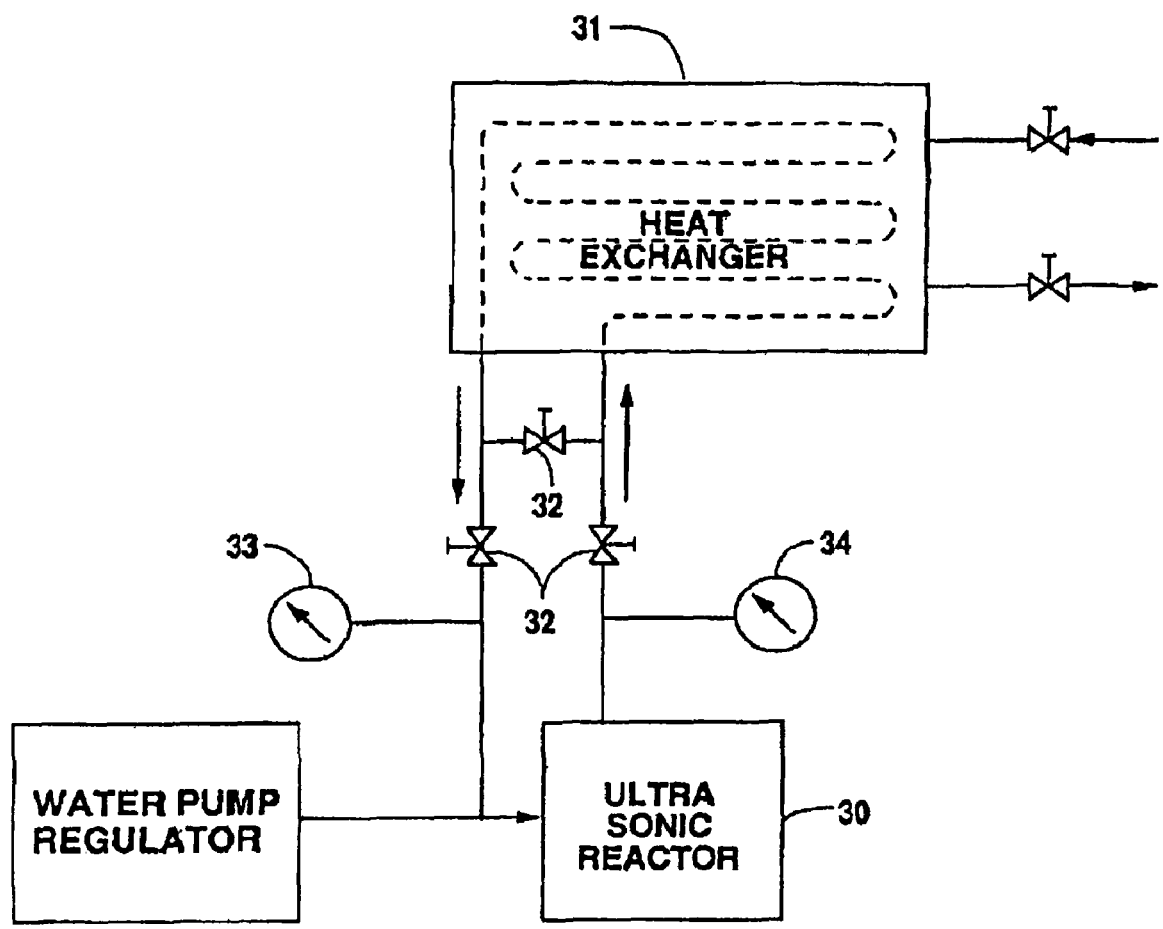
FIG. 9 is a block diagram of a sonic reactor configured for thermal energy production.

FIG. 9 shows an alternate embodiment of a sonic reactor configured for thermal energy production. Ordinary water may be used as a fluid feedstock for the sonic reactor 30. After processing, the fluid is passed to heat exchanger 31, and then may be flushed from the system or returned to the sonic reactor. The fluid flow at the inlet and outlet of the reactor and the processing interval are controlled by valves 32. The fluid temperature differential between the inlet and outlet is measured by gauges 33 and 34.

Figure 10:
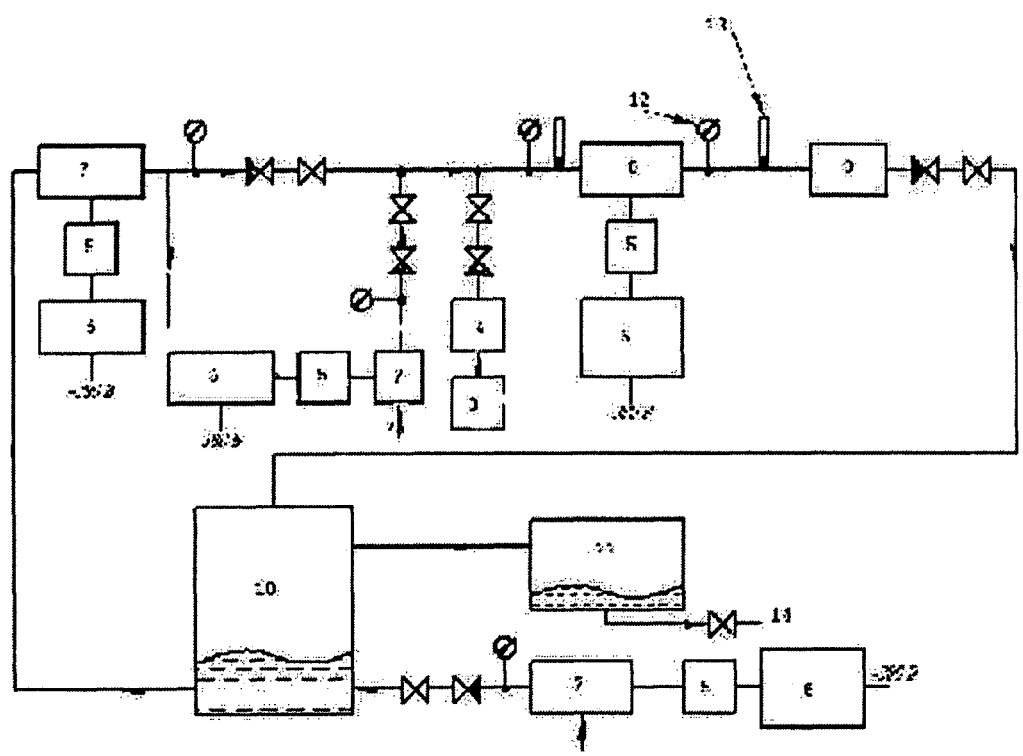
FIG. 10 is a block diagram of a sonic reactor configured for oil refining.

FIG. 10 shows an alternate embodiment of a sonic reactor configured for oil refining. Oils such as crude oil in need of refining, mineral oil, light motor fuels, etc may be used as a fluid feedstock for the reactor. The oil enters at block 1. Water may optionally be delivered through 2. A cylinder with gaseous hydrogen may optionally be used in 3; The following represent the numbered blocks: 4=a gas reducer; 5=electric motor; 6=converters of frequency of rotation of the electric motor; 7=pumps; 8=an ultrasonic reactor; 9=the block of the catalyst (optional); 10=an oil and gas separator; 11=condenser; 12=manometers; 13=thermometer gauges; 14=an output of a ready product. It has been found that the present inventive reactor yields cracking of the long hydrocarbons to shorter chains. Altering the intensity of the reactor, e.g., changing frequency of rotation of a rotor, results in chemical-physio changes to the fluid. Traditional methods to refine oil involve cracking or hydrocracking requiring further purification to allow use of the resulting oil product. Use of the present inventive reactor mechanism and apparatus yielded essentially one end-product with minimal by-product formations, approximately 99% recovery of refined oil from raw material.

Experiments were conducted with the following fluids, and found to yield the desired purified product in high yield and purity: crude oil, diesel oil, vegetable oil, water, ether.

Figure 11:
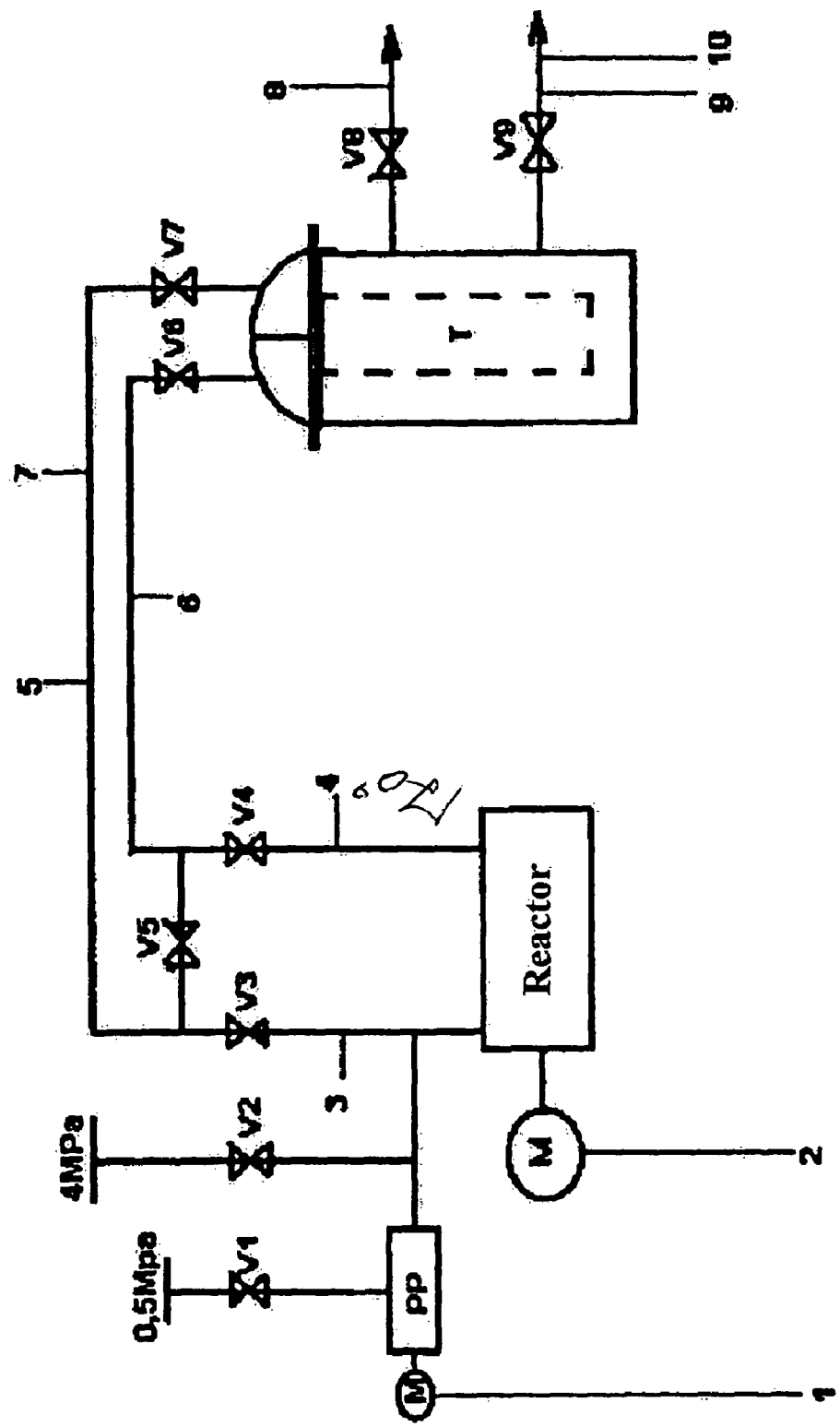
FIG. 11 is an alternate block diagram of a sonic reactor configured for thermal energy production.

FIG. 11 is an alternate block diagram of a sonic reactor configured for thermal energy production. Experiments were conducted comparing electric power consumed to thermal energy generated. A=electric power×10$^8$ joules consumed; B=thermal energy generated×10$^8$ joules; C=the relation of thermal energy to electrical.

| Exp | A | B | C |
|---|---|---|---|
| 1 | 4.7 | 9.5 | 2000 |
| 2 | 8.64 | 19 | 2200 |
| 3 | 2.94 | 14.25 | 4800 |

The reactor was built on the basis of the centrifugal ten-step pump UHC-60/330 having the following: 60 m3/hr capacity; 300 m of water post hydraulic pressure; 2950 rpm shaft revolution speed; 87 KW power consumed; 580 kg weight; the electric motor was a model 7 AZ 315M, 200 KW, cos f=0.9, efficiency 94.3%, voltage 380/660V, current 358/207A. From the achieved results, one can conclude that the quantity of produced thermal energy exceeds the quantity of electric power spent on the process.

Figure 12:
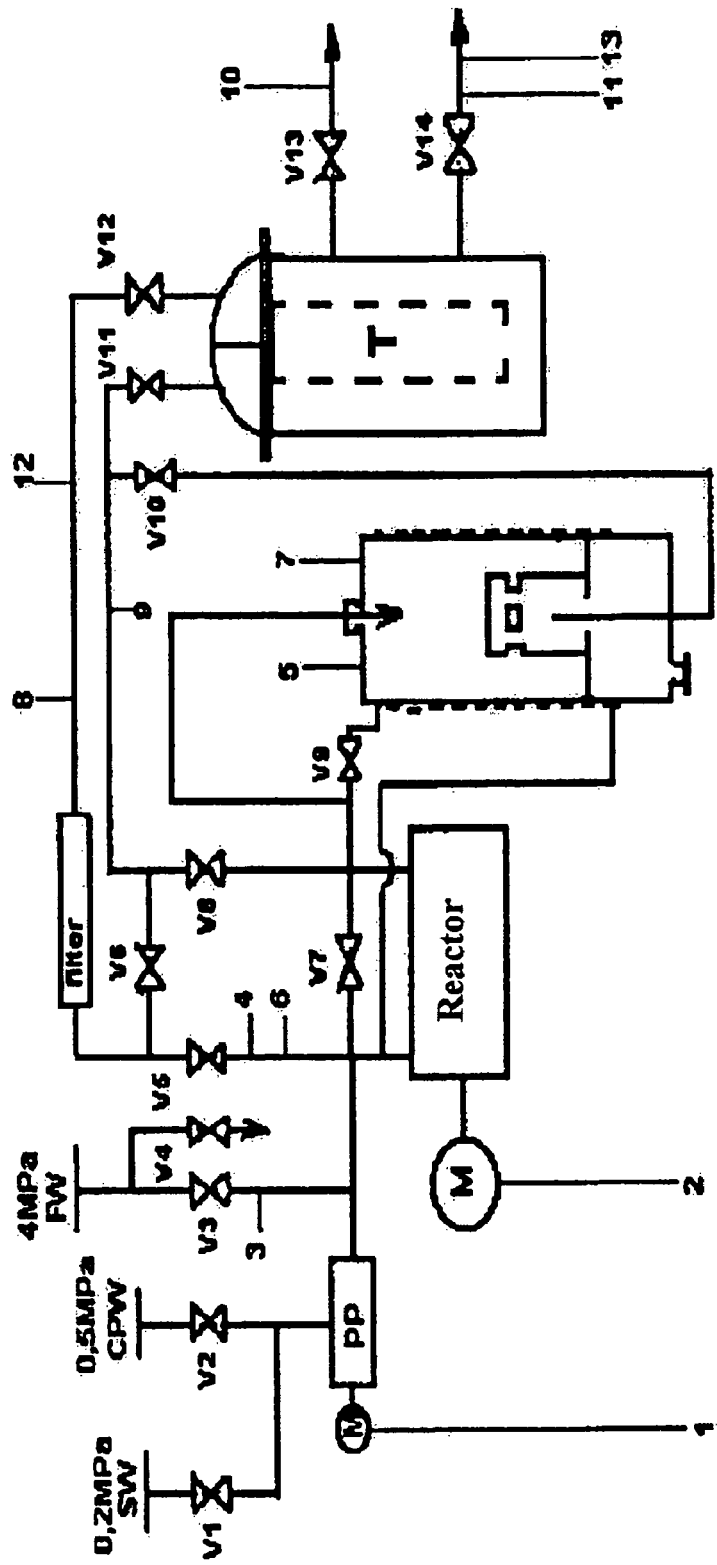
FIG. 12 is a block diagram of a sonic reactor configured for desalination of water.

FIG. 12 is a block diagram of a sonic reactor configured for desalination of water. Experiments were conducted utilizing salt sea water yielding purified water essentially free of sea salt.

Figure 13:
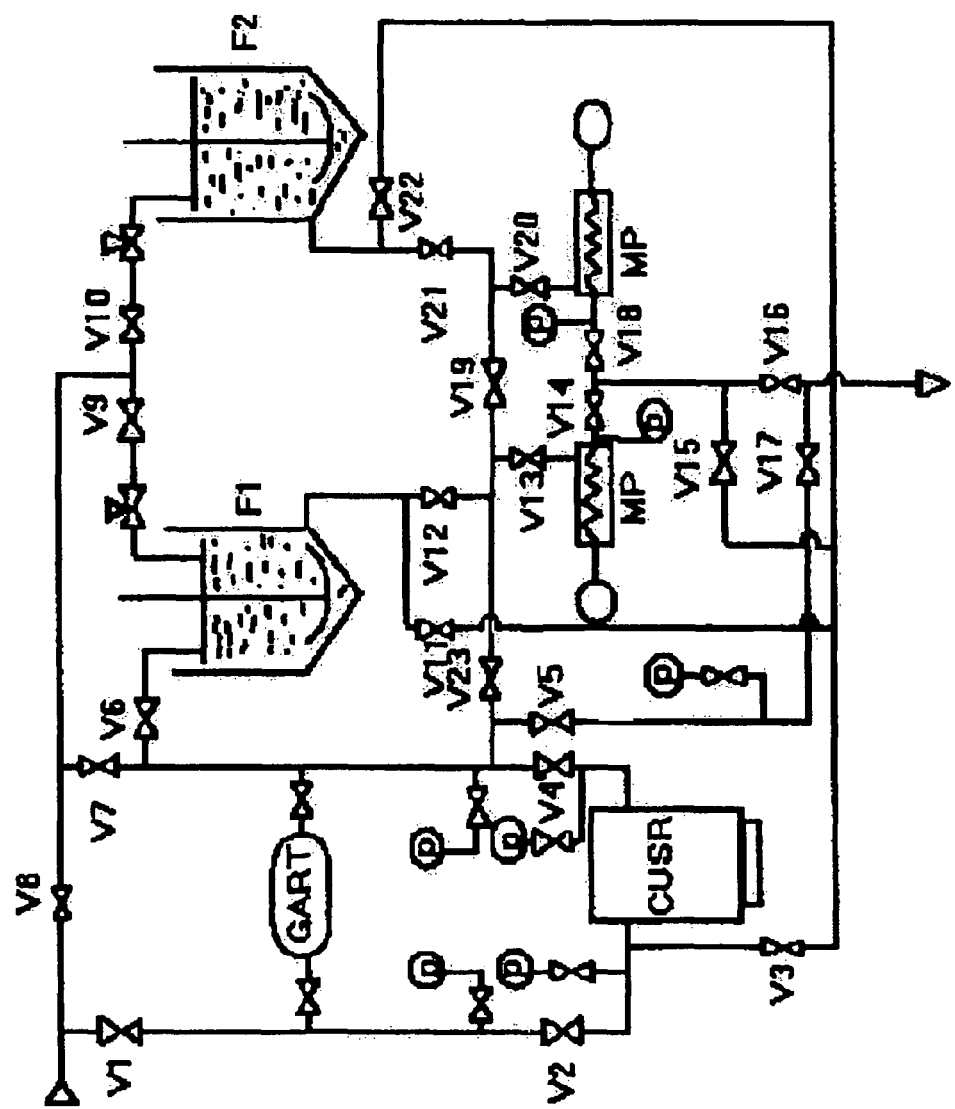
FIG. 13 is a block diagram of a sonic reactor configured for preparation of catalyst.

FIG. 13 is a block diagram of a sonic reactor configured for preparation of catalyst. Raw materials pass as fluids through the reactor to manufacture catalyst. Experiments were conducted utilizing a slurry of zeolite containing aluminum silicate catalyst as a working fluid for cracking in the reactor. A high purity zeolite catalyst, having minor amounts of grains was the resultant product. It was found that optimal constant pressure should be about equal to half of the sound pressure.

TABLE 1 shows experimentally observed thermal power yields for five different sonic reactors having different physical characteristics and operating parameters. The speed of the rotors remained constant across the different configurations, but the number of apertures in the impeller and stator was varied from 70 to 180 and the diameter of the rotor was varied from 0.16 meters to 0.32 meters. The variations in rotor diameters and inter-aperture distances caused substantial variations in the sound frequency, sound intensity, and static pressure produced in the reactor, as reflected in TABLE 1. The efficiency of each arrangement is indicated by the values given for the consumed power and thermal power yield. In the most efficient configuration, a sound wave of frequency 3.6 kHz and intensity of 1 MW/m2 and a static pressure of 0.8 MPa in the reaction chamber yielded 44.4 kW of thermal power while consuming only 17 kW of electrical power.

TABLE 1

| PARAMETER | EXPERIMENTAL CONFIGURATION OF REACTOR | | | | |
|---|---|---|---|---|---|
| | 1 | 2 | 3 | 4 | 5 |
| CONSUMED POWER (kW) | 13 | 17 | 45 | 55 | 90 |
| ACCUSTIC POWER (kW) | 6 | 6 | 15 | 25 | 25 |
| SOUND FREQUENCY (kHz) | 9 | 3.6 | 6 | 3.5 | 6 |
| ROTATION SPEED OF ROTOR (RPM) | 2920 | 2920 | 2920 | 2920 | 2920 |
| NUMBER OF APERTURES ON ROTOR | 180 | 72 | 120 | 70 | 120 |
| DIAMETER OF ROTOR (meters) | 0.26 | 0.16 | 0.25 | 0.19 | 0.32 |
| SOUND INTENSITY (MW/m$^{-2}$) | 4 | 1 | 2.5 | 3 | 3 |
| SOUND PRESSURE (MPa) | 3.5 | 1.7 | 2.7 | 3.0 | 3.0 |
| WORKING PRESSURE (MPa) | 1.7 | 0.8 | 1.4 | 1.5 | 1.5 |
| AVERAGE THERMAL POWER YIELD (kW) | 11.6 | 44.4 | 48.0 | 21.4 | 126.0 |

Figure 14:
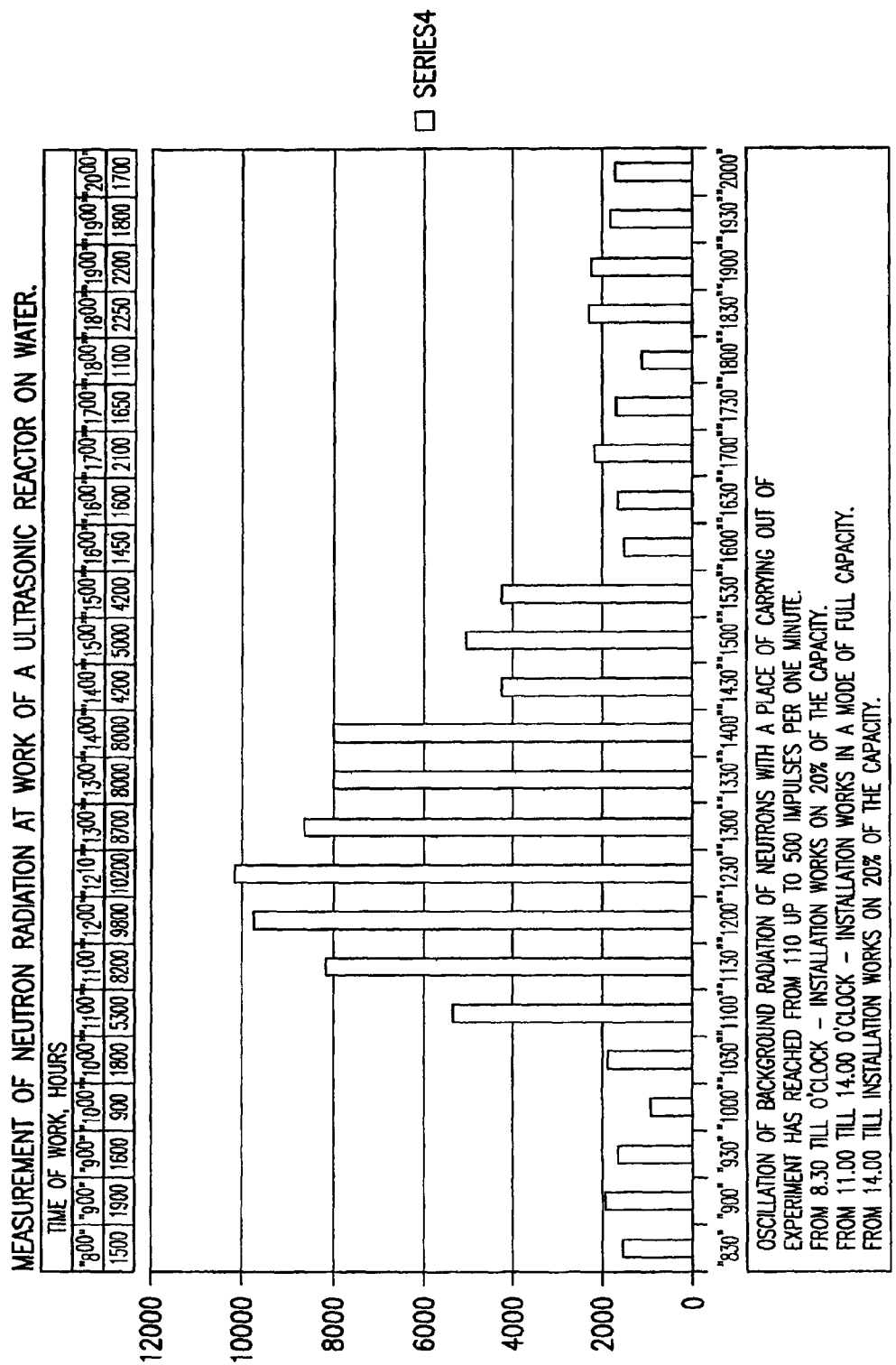
FIG. 14 is a graph of radiation formed during use of a sonic reactor on water.

FIG. 14 depicts a bar graph of radiation formed during use of the sonic reactor. Water was utilized as the fluid. It was found the beta radiation was minimal. The experiments consisted of use of Russian Roentgen meter 5A which employs halogen counters. Tests were conducted varying the pressure in the reactor. Pulses were counted over a 10 minute interval with an interval of 1 minute when the gauge was in contact with the fluid. At more intense operating conditions, radiation occurs and within 24 hours decreases to zero (period of half disintegration is approximately 70 seconds.) Measurements were taken directly on the surface of the reactor and at distances of 6 and 28 meters therefrom. Upon shutdown of the reactor, the radiation vanishes gradually according to the period of half disintegration. Tests were conducted over several days prior to the beginning of the experiments and during the entire time of experiments. The amount of beta radiation was determined by the difference of the dosimeter readings with the detector shutter open and closed. The oscillation of background radiation reached from about 110 to about 500 impulses per minute.

Applications of the present invention include but are not limited to treatment of oil and petroleum refinery products, organic synthesis, thermal energy generation, water treatment such as desalination or disinfection, fine dispersal catalyst production for chemical and petro-chemicals, producing paste in the food industry and perfume goods, liposome based creams such as for pharmacology and cosmetic applications, heat generation, and various military applications such as ultrasound electromagnetic weapons, and neutralization of torpedo or submarine attacks.

Having described the invention by reference to certain of its embodiments, it is pointed out that the embodiments described are illustrative rather than limiting in nature and many variations and modifications are possible within the scope of the present invention.

What is claimed is:

1. A continuous flow sonic reactor, comprising:
   at least one reaction chamber having a rotating centrifugal impeller and a stator mounted therein;
   an inlet on the reaction chamber for supplying a fluid feedstock thereto;
   an outlet on the reaction chamber for receiving the treated feedstock; and
   a plurality of apertures formed in the stator, said apertures being sized and positioned to cause cavitation in the reactor and create sonic energy to act on the feedstock, wherein said apertures are configured with a cumulative area of the apertures relative to an area of said inlet on the reaction chamber and an inter-aperture spacing to produce a sonic field intensity of at least one megawatt per square meter.

2. The sonic reactor of claim 1 wherein said apertures are formed in the shape of a frustum of a cone.

3. The sonic reactor of claim 2, further comprising means for returning the fluid feedstock exiting the outlet to the inlet on the chamber to increase the interval during which the fluid feedstock is subjected to sonic energy.

4. The reactor of claim 1 further comprising interconnected modules, with means to connect therebetween : (a) a pump connected to the reactor block, (b) a separator and condenser block, and (c) a process control block.

5. A continuous flow sonic reactor, comprising:
   at least one reaction chamber having a rotating centrifugal impeller and a stator mounted therein;
   an inlet on the reaction chamber for supplying a fluid feedstock thereto;
   an outlet on the reaction chamber for receiving the treated feedstock; and
   a plurality of apertures formed in the impeller, said apertures being sized and positioned to cause cavitation in the reactor and create sonic energy to act on the feedstock, wherein said apertures are configured with a cumulative area of the apertures relative to an area of said inlet on the reaction chamber and an inter-aperture spacing to produce a sonic field intensity of at least one megawatt per square meter.

6. The sonic reactor of claim 5 wherein said apertures are formed in the shape of a frustum of a cone.

7. The sonic reactor of claim 6, further comprising means for returning the fluid feedstock exiting the outlet to the inlet on the chamber to increase the interval during which the fluid feedstock is subjected to sonic energy.

8. A continuous flow sonic reactor, comprising:
   at least one reaction chamber having a rotating centrifugal impeller and a stator mounted therein;
   an inlet on the reaction chamber for supplying a fluid feedstock thereto;
   an outlet on the reaction chamber for receiving the treated feedstock; and a plurality of apertures formed in the impeller and stator, said apertures being sized and positioned to cause cavitation in the reactor and create sonic energy to act on the feedstock, wherein said apertures are configured with a cumulative area of the apertures relative to an area of said inlet on the reaction chamber and an inter-aperture spacing to produce a sonic field intensity of at least one megawatt per square meter.

9. The sonic reactor of claim 8, further comprising means for returning the fluid feedstock exiting the outlet to the inlet on the chamber to increase the interval during which the fluid feedstock is subjected to sonic energy.

10. A method for treating a fluid feedstock with a sonic reactor including at least one reaction chamber having an impeller and a stator and an inlet on the reaction chamber for supplying the fluid feedstock thereto, the method comprising the steps of:

flowing the fluid feedstock through the sonic reactor;
forming cavitation bubbles in the fluid feedstock; and
collapsing the cavitation bubbles in the fluid feedstock with sound to cause an exothermic reaction in the fluid feedstock,
wherein the sound is created by the flow of the fluid feedstock through apertures in at least one of the impeller or the stator of the reaction chamber, and wherein said apertures are configured with a cumulative area of the apertures relative to an area of said inlet on the reaction chamber and an inter-aperture spacing to produce a sonic field intensity of at least one megawatt per square meter.

11. The method of claim 10 wherein the sound is created by the flow of the feedstock through said apertures in the impeller.

12. The method of claim 10 wherein the sound is created by the flow of the feedstock through said apertures in the stator.

13. The method of claim 10 wherein the sound is created by the flow of the feedstock through periodically coinciding apertures in the impeller and the stator.

14. The method of claim 10 wherein the fluid feedstock includes oil products and said exothermic reaction produces a chemical-physio change to said oil products.

15. The method of claim 10 wherein the exothermic reaction in the fluid feedstock generates thermal energy.

16. The method of claim 10 wherein the fluid feedstock includes salt water and said exothermic reaction produces desalination of said salt water.

17. The method of claim 10 wherein the fluid feedstock includes a raw material for preparing a catalyst and said exothermic reaction produces a chemical-physio change to said fluid feedstock to produce said catalyst.

* * * * *